United States Patent
Hopt

(10) Patent No.: US 10,019,607 B2
(45) Date of Patent: Jul. 10, 2018

(54) MANIPULATION-PROOF CARD READER WITH A COVERING HOOD WHICH HAS A BACK-MOULDED DOUBLE-LAYERED CONDUCTOR TRACK FOIL

(71) Applicant: ddm hopt + schuler GmbH + Co. KG, Rottweil (DE)

(72) Inventor: Karl-Rudolf Hopt, Rottweil (DE)

(73) Assignee: DDM HOPT + SCHULER GMBH & CO. KG, Rottweil (DE)

( * ) Notice: Subject to any disclaimer, the term of this patent is extended or adjusted under 35 U.S.C. 154(b) by 0 days.

(21) Appl. No.: 15/412,009

(22) Filed: Jan. 22, 2017

(65) Prior Publication Data
US 2017/0213055 A1    Jul. 27, 2017

(30) Foreign Application Priority Data

Jan. 25, 2016  (EP) ...................................... 16152558
Apr. 14, 2016  (DE) .................... 20 2016 101 958 U

(51) Int. Cl.
*G06K 7/06*  (2006.01)
*G06K 7/00*  (2006.01)

(52) U.S. Cl.
CPC ......... *G06K 7/0069* (2013.01); *G06K 7/0021* (2013.01); *G06K 7/0078* (2013.01)

(58) Field of Classification Search
CPC ..... G06K 7/0021; G06K 13/08; G06K 19/067
USPC ....................................................... 235/441
See application file for complete search history.

(56) References Cited

U.S. PATENT DOCUMENTS

| 6,210,193 | B1* | 4/2001 | Ito ........................ G06K 7/0021 439/326 |
| 6,336,588 | B1* | 1/2002 | Reichardt ............ G06K 7/0021 235/439 |
| 6,520,417 | B1* | 2/2003 | Neifer .................. G06K 7/0047 235/487 |
| 6,550,684 | B1* | 4/2003 | Zuin .................... G06K 7/0021 235/479 |

(Continued)

FOREIGN PATENT DOCUMENTS

DE  10 2009 026 466 B3   7/2010
EP       1 785 911 A1   5/2007

(Continued)

*Primary Examiner* — Ahshik Kim
(74) *Attorney, Agent, or Firm* — Hackler Daghighian Martino & Novak

(57) ABSTRACT

A card reader includes a card reader housing with a card insertion opening, a contact unit, which is arranged in the card reader housing, and a hood which covers the contact unit, apart from the card insertion opening. The hood is back-molded on the inner side with an at least two-layered conductor track foil. The first layer, which faces the hood, has an extensive drill-protection conductor track structure with at least one continuous drill-protection conductor track. The second layer, which faces away from the hood, has a lift-off protection conductor track structure with at least one lift-off-protection conductor track. The at least one drill-protection conductor track is routed onto the second layer by means of through connections of the conductor track foil and ends in electrical connection contacts of the second layer. The at least one lift-off-protection conductor track ends in electrical connection contacts of the second layer.

14 Claims, 5 Drawing Sheets

(56) References Cited

U.S. PATENT DOCUMENTS

2008/0132119 A1    6/2008  Daubigney et al.

FOREIGN PATENT DOCUMENTS

| EP | 1 927 931 A1 | 6/2008 |
| EP | 2 950 234 A1 | 12/2015 |
| WO | 2010 136001 A1 | 12/2010 |

* cited by examiner

MANIPULATION-PROOF CARD READER WITH A COVERING HOOD WHICH HAS A BACK-MOULDED DOUBLE-LAYERED CONDUCTOR TRACK FOIL

CROSS REFERENCE TO RELATED APPLICATIONS

This application claims priority to European Patent Application No. 16 152 558.9, filed Jan. 25, 2016, and to German Utility Model Application No. DE 20 2016 101 958.3, filed Apr. 14, 2016, the entire contents of which are hereby incorporated by this reference.

DESCRIPTION

Field of the Invention

The present invention relates to a card reader for data interchange with a chip card, having a card reader housing with a card insertion opening, a contact unit, which is arranged in the card reader housing, for data interchange with a chip card which is inserted into the card reader housing through the card insertion opening, and a hood which covers the contact unit, apart from the card insertion opening, and which is composed of plastic.

Background of the Invention

A card reader of this type has been disclosed, for example, by DE 10 2009 026 466 B3.

This known card reader has an injection-moulded plastic part in the form of a drill-protection hood with a drill-protection conductor track structure provided on the said injection-moulded plastic part. The drill-protection hood is an injection-moulded plastic part which, on its inner side, has a metallized meandering conductor track structure as drill protection. To this end, a meandering track structure (approximately 0.15 mm track width) with a spacing of approximately 0.25 mm was removed by laser from the inner side over the entire surface area or extensively. After this laser structuring, the plastic part was metallized. A continuous electrical conductor track is placed on the entire inner side between two connection contacts owing to the now metallized drill-protection conductor track structure. If the drill-protection hood is drilled or ground down for manipulation purposes, the continuous conductor track across which a current flows during operation is also severed in the process. This is identified by a monitoring unit which then no longer permits a reading process and/or takes the card reader out of operation.

In comparison, the object of the present invention is to make a card reader of the type mentioned in the introductory part even more secure against manipulation.

SUMMARY OF THE INVENTION

According to the invention, this object is achieved in that the hood is back-moulded on the inner side with an at least two-layered conductor track foil, the first layer, which faces the hood, has an extensive drill-protection conductor track structure with at least one continuous drill-protection conductor track, and the second layer, which faces away from the hood, has a lift-off-protection conductor track structure with at least one lift-off-protection conductor track, the at least one drill-protection conductor track is routed to the second layer by means of through connections of the conductor track foil and ends in electrical connection contacts of the second layer, and the at least one lift-off-protection conductor track ends in electrical connection contacts of the second layer.

According to the invention, the conductor track foil is cohesively connected or fused with the plastic material of the hood. If the hood is drilled or lifted off from the card reader housing for manipulation purposes, the drill-protection conductor track structure which was closed up until this point or the lift-off-protection conductor track structure which was closed up until this point is necessarily interrupted as a result. This interruption in the electrical circuit is identified by a monitoring unit which then no longer permits a reading process and/or takes the contact unit out of operation.

Rather than being of double-layered design, the conductor track foil can also be of triple-layered design or even be designed with a greater number of layers with further drill-protection and lift-off-protection conductor track structures, wherein the first layer, which faces the hood, is always formed by the extensive drill-protection conductor track structure.

The through connections of the conductor track foil are particularly advantageously arranged in a non-back-moulded foil tab of the conductor track foil, so that the through connections are surrounded by the back-moulded hood and consequently are protected against manipulation operations.

The thinner the line thickness of the conductor tracks and the smaller the line spacing between the conductor tracks of the drill-protection conductor track structure, the better the protection against manipulation. The at least one drill-protection conductor track preferably has a line width of at most 0.2 mm, in particular at most 0.15 mm, and a line spacing of at most 0.3 mm, in particular at most 0.2 mm.

The at least one lift-off-protection conductor track particularly preferably has a plurality of conductor track sections, which are not connected to one another, and at least one lift-off switch which has two exposed electrical contact areas in which in each case two conductor track sections end. The two contact areas are electrically connected to one another, for example, by a cover panel which is composed of electrically conductive material at least in sections or by a printed circuit board on which the card reader, together with the hood, is mounted. The two exposed electrical contact areas can either be arranged so close to one another that they form a single lift-off switch or so far away from one another that they form two lift-off switches. If the hood is lifted off from the cover panel or from the printed circuit board for manipulation purposes, the lift-off-protection conductor track structure which was closed up until this point is necessarily interrupted as a result. The at least one lift-off-protection conductor track can have one or more of lift-off switches which are connected in series. The cover panel is further advantageously arranged between the card reader housing and the hood and fastened to the card reader housing.

The cover panel preferably has a plurality of resilient tabs which are supported on the inner side of the hood and electrically connect the exposed electrical contact areas of the at least one lift-off switch to one another. In the case of two exposed electrical contact areas which are arranged close to one another, the tabs are either composed of electrically conductive material and insulated from one another or each have electrical contact sections which are insulated from one another and which electrically connect the contact areas of the at least one lift-off switch to one another. In the case of two exposed electrical contact areas which are arranged at a distance from one another, the entire cover panel can be composed of electrically conductive material in order to connect the two contact areas to one another.

The connection contacts are preferably arranged on the bottom side of the hood, in particular as exposed electrical contact areas of the conductor tracks, in order for mating contacts of a printed circuit board to make contact with them.

The at least one drill-protection conductor track and the at least one lift-off-protection conductor track are either connected in series in order to form a common electrical circuit or each form electrical circuits which are separate from one another.

The card reader is particularly preferably mounted on a printed circuit board, wherein electrical contact is made with the connection contacts of the hood by corresponding mating contacts of the printed circuit board.

The invention also relates to a hood which is composed of plastic, in particular for covering a contact unit of a card reader which is designed as above, having an at least two-layered conductor track foil which is back-moulded on the inner side, wherein the first layer, which faces the hood, has an extensive drill-protection conductor track structure with at least one continuous drill-protection conductor track, and the second layer, which faces away from the hood, has a lift-off-protection conductor track structure with at least one lift-off-protection conductor track, wherein the at least one drill-protection conductor track is routed to the second layer by means of through connections of the conductor track foil and ends in electrical connection contacts of the second layer, and wherein the at least one lift-off-protection conductor track ends in electrical connection contacts of the second layer.

All of the features of the hood mentioned above in connection with the card reader according to the invention can also be implemented in the hood according to the invention.

Further advantages of the invention are evident from the description, the claims and the drawing. The features mentioned above and those presented further can likewise be used in each case by themselves or as a plurality in any desired combinations. The embodiments shown and described should not be understood as an exhaustive list, but rather are of exemplary character for portraying the invention.

DETAILED DESCRIPTION OF THE PREFERRED EMBODIMENTS

In the following description of the figures, identical reference symbols are used for equivalent or functionally equivalent components.

Figure 1:
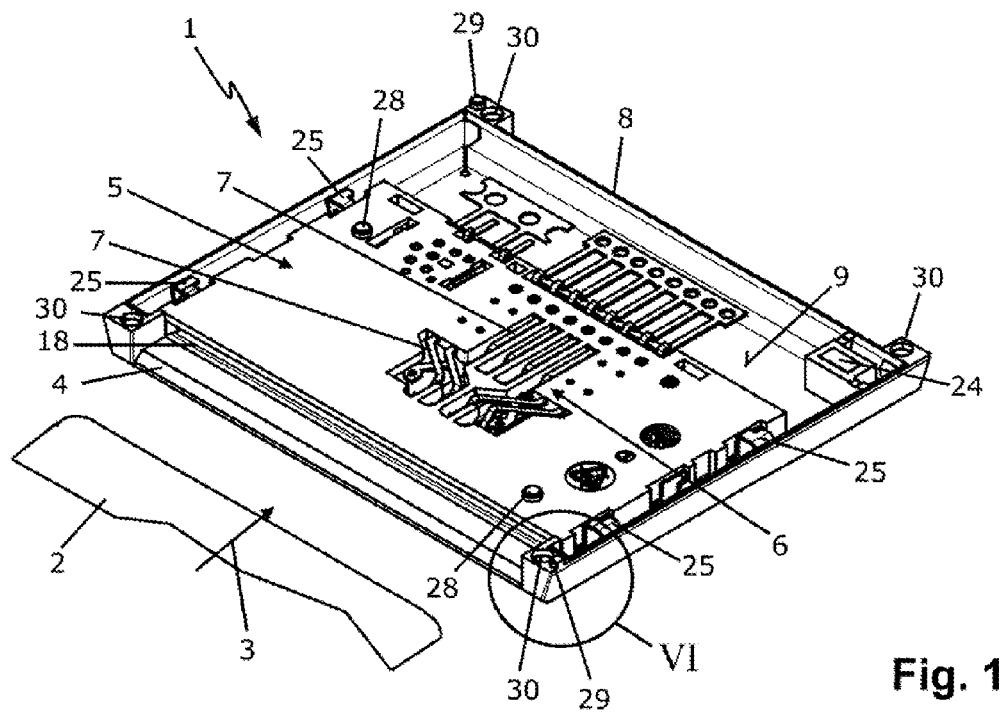
FIG. 1 shows a perspective view of the bottom side of a first embodiment of the card reader according to the invention.

The card reader 1 shown in FIG. 1 is a so-called push/pull card reader in which a chip card 2 is inserted into a card reader housing 5, until it reaches the data interchange position, by the user in the insertion direction 3 by means of a card insertion opening 4 and is withdrawn from the card reader 1 again by the user after the data interchange operation. The chip card 2 is fitted with a microchip (not shown) for storing data, the contacts of the said microchip being provided as electrical contact fields (not shown) on the card surface. A contact unit 6 for data interchange with the chip card 2 which is inserted into the card reader housing 5 through the card insertion opening 4 is arranged in the card reader housing 5. The contact unit 6 has a plurality of elastically deformable contact springs 7 which protrude into the card path by way of their three contact ends. The three contact ends of the contact springs 7 are deflected out of the card path by the inserted chip card 2 and make contact with the electrical contact fields of the chip card 2.

The card reader housing 5 is covered by a hood 8 (FIG. 2) which is composed of plastic and the inner side of which is completely back-moulded with a conductor track foil 9. The conductor track foil 9 is shown as a planar foil blank in FIG. 3a and in the erected state in FIG. 3b.

Figure 4:
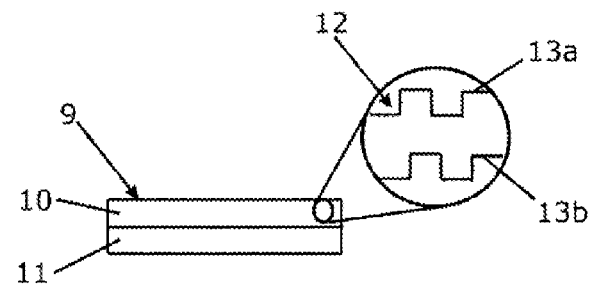
FIG. 4 schematically shows the cross section of the conductor track foil.

As shown in FIG. 4, the conductor track foil 9 is in the form of a flexible two-layered conductor track foil, the first layer of the said conductor track foil, which first layer faces the hood 8, being denoted 10 and the second layer of the said conductor track foil, which second layer faces away from the hood 8, being denoted 11. The first layer 10 has a drill-protection conductor track structure 12 in the form of two continuous meandering drill-protection conductor tracks 13a, 13b over an extensive surface area, the line width of the drill-protection conductor tracks being at most 0.2 mm and the line spacing of the said drill-protection conductor tracks in relation to one another being at most 0.3 mm.

Figure 3A:
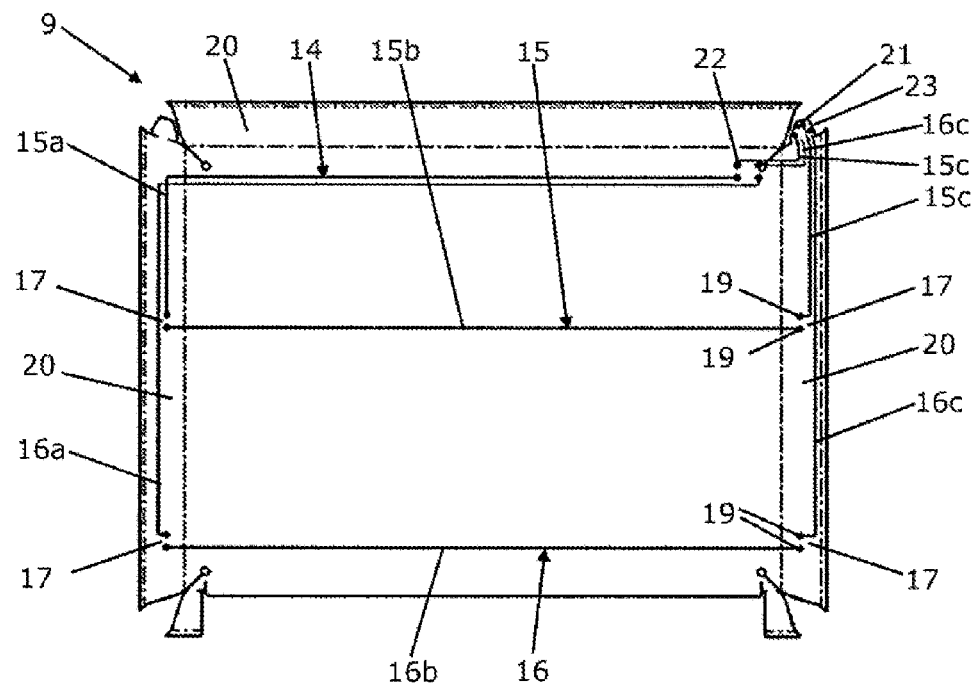
FIG. 3a shows the conductor track foil from FIG. 2 as a planar foil blank.

As shown in FIG. 3a, the second layer 11 has a lift-off-protection conductor track structure 14 in the form of two lift-off-protection conductor tracks 15, 16 with in each case two lift-off switches 17 which are connected in series. The lift-off protection conductor tracks 15, 16 are each formed by three conductor track sections 15a-15c, 16a-16c which are not connected to one another and which, together with a cover panel 18 (FIG. 5), each form the lift-off switches 17. Each lift-off switch 17 is formed by two adjacent, exposed electrical contact areas 19, in which in each case two conductor track sections of the associated lift-off-protection conductor track 15, 16 end, and also by the cover panel 18 which electrically connects the two electrical contact areas 19 to one another, as is described in further detail below.

Figure 2:
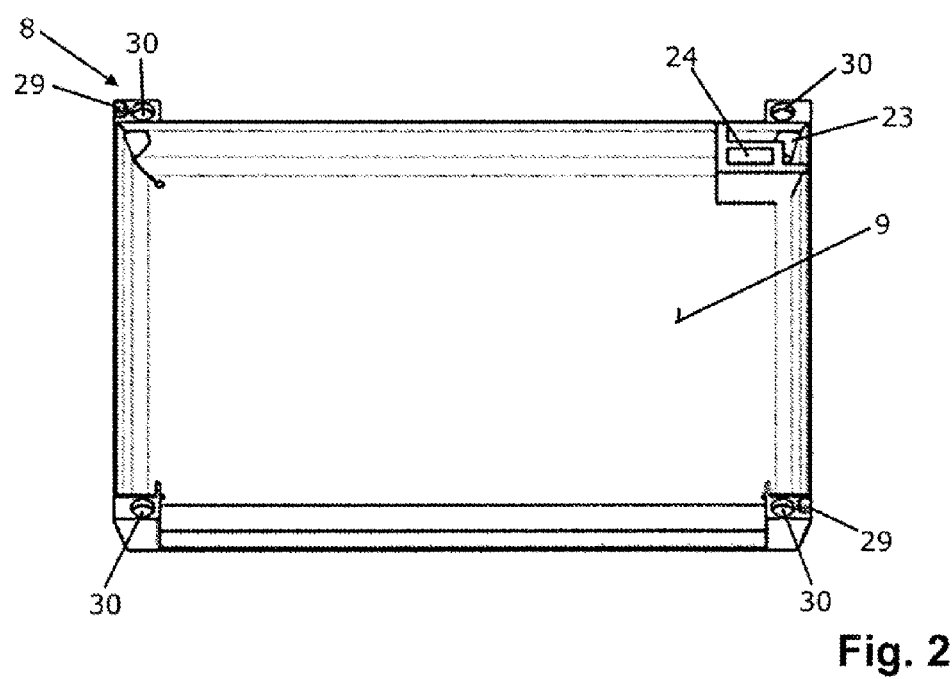
FIG. 2 shows a plan view of the open bottom side of a hood, shown in FIG. 1, which is back-moulded on the inner side with a two-layered conductor track foil.
Figure 3B:
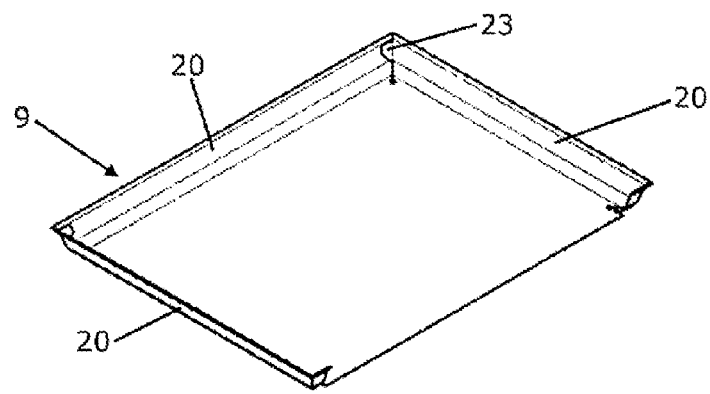
FIG. 3b shows the conductor track foil from FIG. 2 in the erected state.

As shown in FIGS. 3*a* and 3*b*, the side edges of the three erected side walls 20 of the conductor track foil 9 overlap, so that the erected conductor track foil 9 has a gap-free drill-protection conductor track structure 12 on the outer side. This erected conductor track foil 9 is then inserted into the injection-moulding die of the hood 8 and, during the subsequent in-mould injection-moulding process, the hood 8 is back-moulded on the inside with the conductor track foil 9, as shown in FIG. 2.

In the exemplary embodiment shown, the one, first drill-protection conductor track 13*a* and the one, first lift-off-protection conductor track 15 are connected to one another in series by means of through connections 21 of the conductor track foil 9, wherein the two ends of this first conductor track series circuit are formed by connection contacts in the form of two adjacent, exposed electrical contact areas 22 of the second layer 11. The other, second drill-protection conductor track 13*b* and the other, second lift-off-protection conductor track 16 are likewise connected to one another in series by means of the through connections 21 of the conductor track foil 9, wherein the two ends of this second conductor track series circuit are likewise formed by connection contacts in the form of two adjacent, exposed electrical contact areas 22 of the second layer 11. As shown in FIGS. 3*a* and 3*b*, the through connections 21 run in a non-back-moulded foil tab 23 of the conductor track foil 9 which projects into the interior of the hood 8 or bears against a back-moulded hood inner wall on the inner side, that is to say is surrounded by the back-moulded hood 8 in each case. The total of four exposed electrical contact areas 22 are arranged on the bottom side of the hood, for example as exposed electrical contact areas, within a divided-off contact region 24 and, together with a printed circuit board on which the card reader 1 is mounted, form a further lift-off switch 17.

Figure 5:
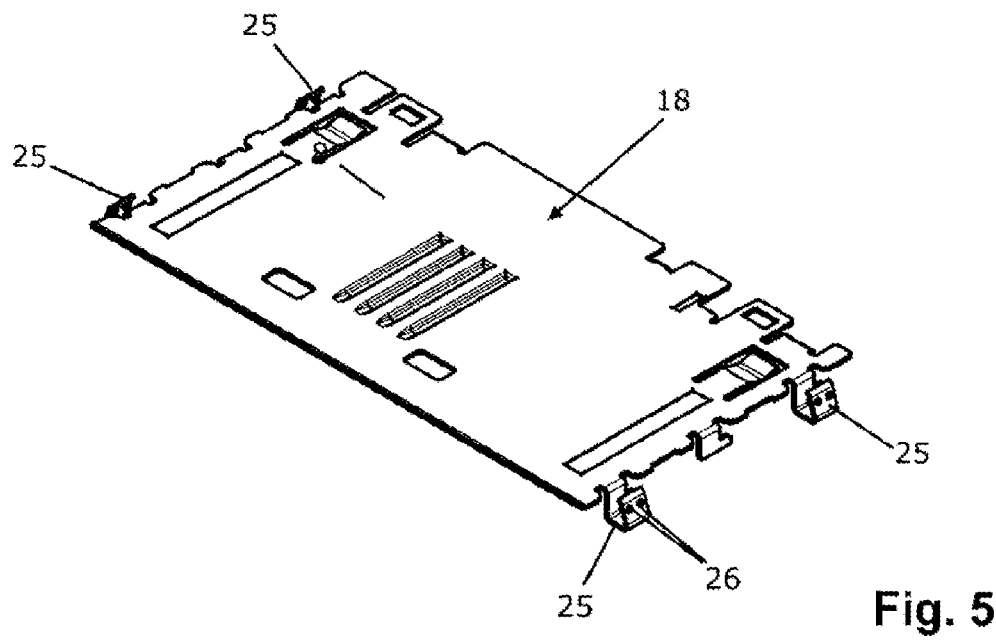
FIG. 5 shows a perspective view of a cover panel which is only partially visible in FIG. 1.
Figure 6:
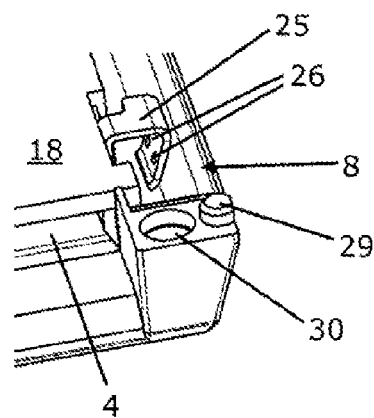
FIG. 6 shows a view of a detail of the card reader in accordance with VI in FIG. 1.

The cover panel 18 is composed of electrically conductive material and has, as shown in FIG. 5, four resilient tabs 25 which are bent over in a U shape and each have two point projections 26, wherein either the tabs 25 themselves or otherwise contact sections which run on the said tabs and electrically connect the point projections 26 to one another are electrically insulated from one another. The cover panel 18 is arranged between the card reader housing 5 and the hood 8. To this end, the cover panel 18, after the card reader housing 5 has been fastened to it, is inserted into the hood 8 in a precise position (FIG. 6), as a result of which the four tabs 25 are supported against the inner side of the hood 8 and, by way of their point projections 26, make electrical contact with the exposed electrical contact areas 19 of the second layer 11 and in this way close the lift-off switches 17.

Figure 7:
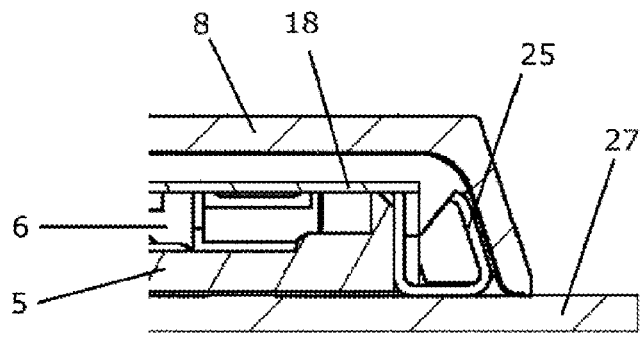
FIG. 7 shows a sectional view of the card reader which is mounted on a printed circuit board.

As shown in FIG. 7, the card reader housing 5 and the hood 8 are mounted onto a printed circuit board 27 in a precise position with the aid of positioning projections 28, 29 of the card reader housing 5 and of the hood 8, which positioning projections engage into corresponding openings in the printed circuit board 27. The hood 8 is screwed to the printed circuit board 27 by means of screws which pass through holes 30 in the four corners of the hood. When mounting the hood 8, electrical contact is made with the exposed electrical contact areas 22 of the bottom side of the hood by corresponding mating contacts of the printed circuit board 27.

If the hood 8 is drilled or ground down from the outside for manipulation purposes, its drill-protection conductor track structure 12, across which a current flows during operation, is necessarily destroyed as a result, and consequently the electrical circuit which was closed up until this point is interrupted. This is identified by a monitoring unit (not shown) of the printed circuit board 27 which then no longer permits a reading process and/or takes the contact unit 6 out of operation. If the hood 8 is lifted off from the cover panel 18 or from the printed circuit board 27 for manipulation purposes, the electrical contact of the electrical contact areas 19, 22 of the hood 8 with the point projections 26 of the tabs 25 or with the mating contacts of the printed circuit board 27 is interrupted, that is to say the associated lift-off switch 17 is opened and consequently the electrical circuit which was closed up until this point is necessarily interrupted as a result. This is also identified by the monitoring unit which then no longer permits a reading process and/or takes the contact unit 6 out of operation. Therefore, unnoticed manipulation of the card reader 1 is not possible, as a result of which a "secure card reader" is provided.

Rather than, as in the exemplary embodiment shown, connecting the drill-protection conductor tracks 13*a*, 13*b* and the lift-off-protection conductor tracks 15, 16 to one another in series to form a common electrical circuit in each case, the drill-protection conductor tracks 13*a*, 13*b* and the lift-off-protection conductor tracks 15, 16 are electrical circuits which are separate from one another in each case and which are separately monitored by the monitoring unit in exemplary embodiments which are not shown. The drill-protection conductor tracks 13*a*, 13*b* of the first layer 10 are moved into conductor tracks of the second layer 11 with the aid of the through connections 21 and end in dedicated electrical contact areas 22 in the said layer.

Figure 8:
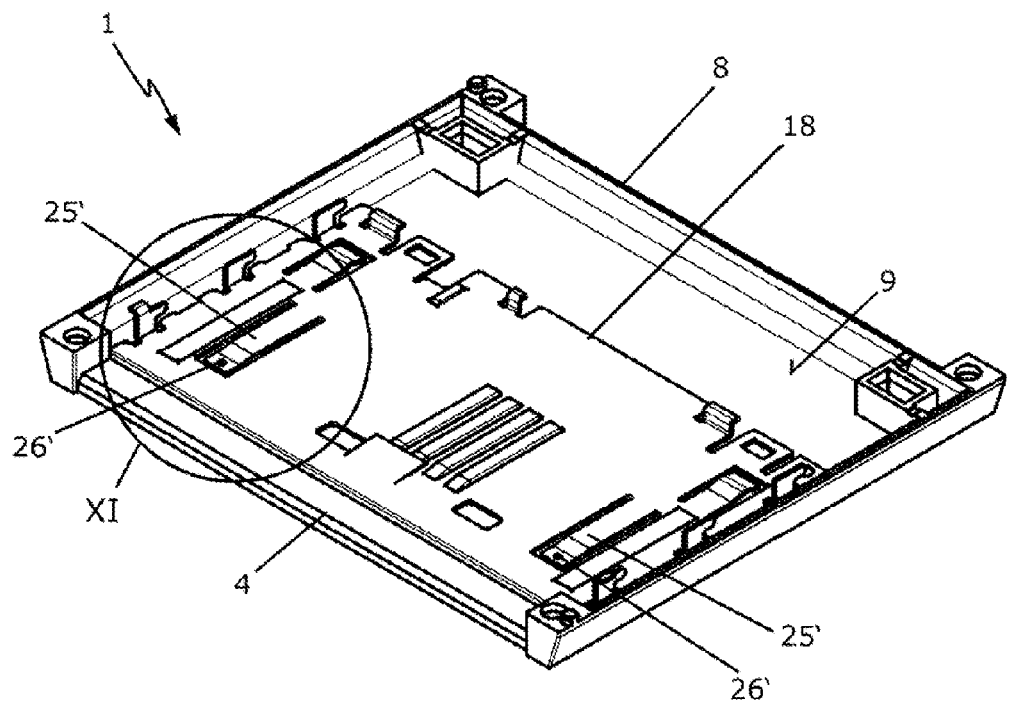
FIG. 8 shows a perspective view of the bottom side of a second embodiment of the card reader according to the invention, but without the card reader housing.
Figure 9:
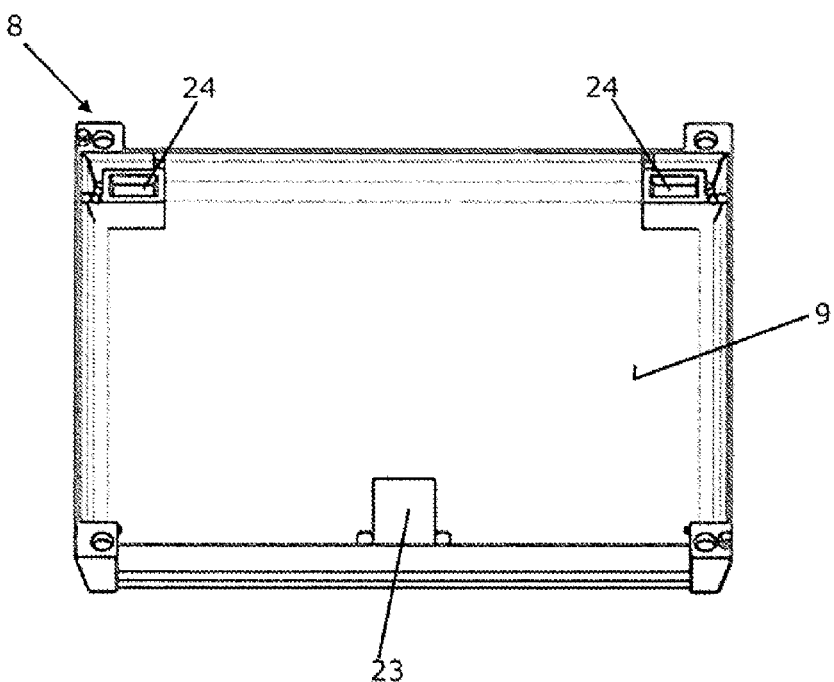
FIG. 9 shows a plan view of the open bottom side of a hood, shown in FIG. 8, which is back-moulded on the inner side with a two-layered conductor track foil.

The card reader 1 shown in FIG. 8 differs from the card reader of FIGS. 1-7 owing to modifications to the conductor track foil 9 and to the cover panel 18. FIG. 9 shows the open bottom side of the hood 8 which is back-moulded on the inner side with the two-layered conductor track foil 9.

Figure 10:
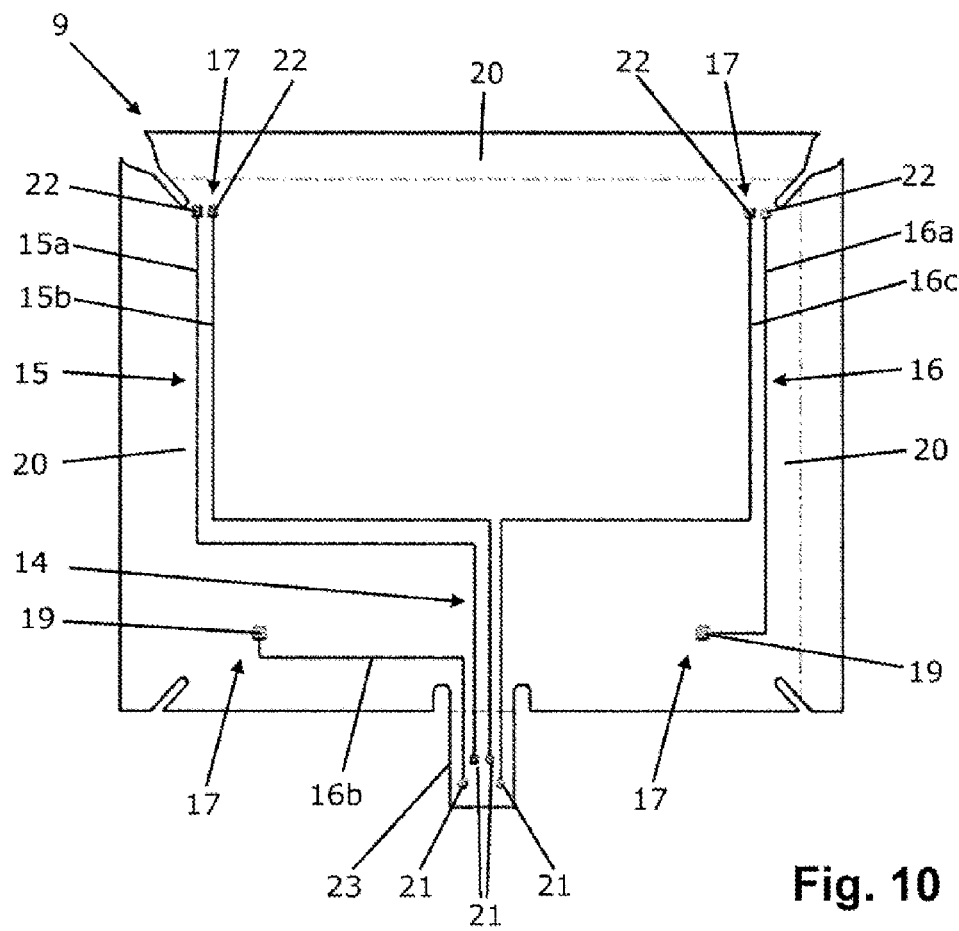
FIG. 10 shows the conductor track foil from FIG. 9 as a planar foil blank.

As shown by the planar foil blank of FIG. 10, the second layer 11 of the conductor track foil 9, which second layer faces away from the hood 8, has a lift-off-protection conductor track structure 14 in the form of two lift-off-protection conductor tracks 15, 16 with a total of four lift-off switches 17. The lift-off-protection conductor track 15 is formed by two conductor track sections 15*a*, 15*b* which are connected to the one, first-protection conductor track 13*a* in series by means of through connections 21 of the conductor track foil 9. This first conductor track series circuit ends in two adjacent, exposed electrical contact areas 22 of the second layer 11, which contact areas, together with the printed circuit board 27 on which the card reader 1 is mounted, form a lift-off switch 17. The lift-off-protection conductor track 16 is formed by three conductor track sections 16*a*-16*c*, of which two conductor track sections 16*b*, 16*c* are connected to the other, first drill-protection conductor track 13*b* in series by means of through connections 21 of the conductor track foil 9. This second conductor track series circuit likewise ends in two adjacent, exposed electrical contact areas 22 of the second layer 11, which contact areas, together with the printed circuit board 27, also form a lift-off switch 17. The conductor track sections 16*a*, 16*b* are not connected to one another, but rather end in two exposed electrical contact areas 19 of the second layer 11, which contact areas are situated so far away from one another that said contact areas, together with the cover panel 18, form two further lift-off switches 17. Therefore, each lift-off switch 17 is formed by two adjacent, exposed electrical contact areas 19, 22, in which in each case two conductor track sections of the associated lift-off-protection conductor track 15, 16 end, and also by the cover panel 18 or the printed circuit board 27 which electrically connect the two electrical contact areas 19, 22 to one another as is described in further detail below.

In the erected state, the side edges of the three erected side walls 20 of the conductor track foil 9 overlap, so that the erected conductor track foil 9 has a gap-free drill-protection conductor track structure 12 on the outer side. This erected conductor track foil 9 is then inserted into the injection-moulding die of the hood 8 and, during the subsequent in-mould injection-moulding process, the hood 8 is back-moulded on the inner side with the conductor track foil 9, as shown in FIG. 9. The through connections 21 run in a foil tab 23 of the conductor track foil 9 which projects into the interior of the hood 8 or bears on the inner side against a back-moulded hood inner wall, that is to say is surrounded by the back-moulded hood 8 in each case. The exposed electrical contact areas 22, in which the two conductor tracks 15, 16 end, are arranged on the bottom side of the hood within two divided-off contact regions 24.

Figure 11:
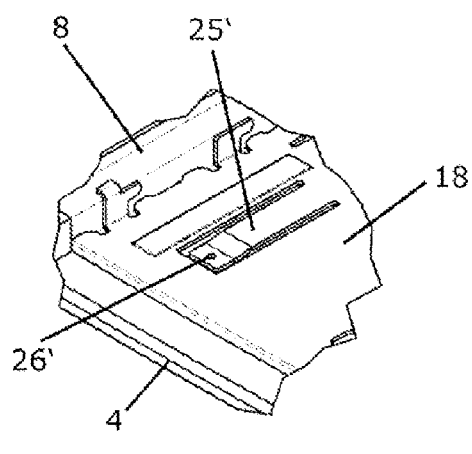
FIG. 11 shows a view of a detail of the card reader according to XI in FIG. 8.

Rather than four laterally projecting, resilient tabs 25 as in FIG. 5, the cover panel 18 shown in FIG. 8 and in detail in FIG. 11 has two resilient tabs 25' on both sides of the contact unit 6, not shown here, which tabs are cut free as spring tongues in the cover panel 18 and the free tab ends of which are directed in the direction of the card insertion opening 4. The free tab ends are extended in the direction of the hood 8 and each have a point projection 26'.

Figure 12:
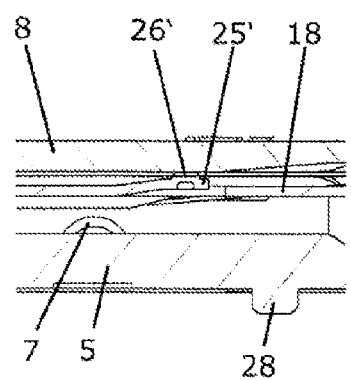
FIG. 12 shows a sectional view of the card reader from FIG. 8.

The cover panel 18 is composed of electrically conductive material and is arranged between the card reader housing 5 and the hood 8. To this end, the cover panel 18, after the card reader housing 5 has been fastened to it, is inserted into the hood 8 in a precise position (FIG. 8), as a result of which the two extended tabs 25' are supported against the inner side of the hood 8 and, by way of their point projections 26', make electrical contact with the exposed electrical contact areas 19 of the second layer 11 and in this way close the two associated lift-off switches 17 (FIG. 12). When the hood 8 is mounted onto the printed circuit board 27, electrical contact is made with the exposed electrical contact areas 22 of the bottom side of the hood, which contact areas are arranged within the divided-off contact regions 24, by corresponding mating contacts of the printed circuit board 27, and as a result the two associated lift-off switches 17 are closed.

If the hood 8 is drilled or ground down from the outside for manipulation purposes, its drill-protection conductor track structure 12, across which a current flows during operation, is necessarily destroyed as a result, and consequently the electrical circuit which was closed up until this point is interrupted. This is identified by a monitoring unit (not shown) of the printed circuit board 27 which then no longer permits a reading process and/or takes the contact unit 6 out of operation. If the hood 8 is lifted off from the cover panel 18 or from the printed circuit board 27 for manipulation purposes, the electrical contact of the electrical contact areas 19, 22 of the hood 8 with the point projections 26' of the tabs 25' or with the mating contacts of the printed circuit board 27 is interrupted, that is to say the associated lift-off switch 17 is opened and consequently the electrical circuit which was closed up until this point is necessarily interrupted as a result. This is also identified by the monitoring unit which then no longer permits a reading process and/or takes the contact unit 6 out of operation. Therefore, unnoticed manipulation of the card reader 1 is not possible, as a result of which a "secure card reader" is provided.

What is claimed is:

1. A card reader for data interchange with a chip card, comprising:
    a card reader housing with a card insertion opening;
    a contact unit, which is arranged in the card reader housing, for the data interchange with the chip card which is inserted into the card reader housing through the card insertion opening; and
    a hood which covers the contact unit, apart from the card insertion opening, and which is composed of plastic;
    wherein the hood is back-moulded on the inner side with an at least two-layered conductor track foil, the first layer, which faces the hood, has an extensive drill-protection conductor track structure with at least one continuous drill-protection conductor track, and the second layer, which faces away from the hood, has a lift-off protection conductor track structure with at least one lift-off-protection conductor track;
    wherein the at least one drill-protection conductor track is routed onto the second layer by means of through connections of the conductor track foil and ends in electrical connection contacts of the second layer; and
    wherein the at least one lift-off-protection conductor track ends in electrical connection contacts of the second layer.

2. The card reader according to claim 1, wherein the through connections of the conductor track foil are arranged in a non-back-moulded foil tab of the conductor track foil.

3. The card reader according to claim 1, wherein the at least one drill-protection conductor track has a line thickness of at most 0.2 mm and a line spacing of at most 0.3 mm.

4. The card reader according to claim 1, wherein the at least one lift-off-protection conductor track has a plurality of conductor track sections, which are not connected to one another, and at least one lift-off switch which has two exposed electrical contact areas in which in each case two conductor track sections end.

5. The card reader according to claim 4, wherein the at least one lift-off-protection conductor track has a plurality of lift-off switches which are connected in series.

6. The card reader according to claim 4, wherein the adjacent contact areas are electrically connected to one another by a cover panel which is composed of electrically conductive material at least in sections or by a printed circuit board.

7. The card reader according to claim 6, wherein the cover panel is arranged between the card reader housing and the hood.

8. The card reader according to claim 6, wherein the cover panel is fastened to the card reader housing.

9. The card reader according to claim 6, wherein the cover panel has a plurality of resilient tabs which are supported on the inner side of the hood and electrically connect the exposed electrical contact areas of the at least one lift-off switch to one another.

10. The card reader according to claim 1, wherein the connection contacts are arranged on the bottom side of the hood as exposed electrical contact areas of the conductor tracks.

11. The card reader according to claim 1, wherein the at least one drill-protection conductor track and the at least one lift-off-protection conductor track are connected in series and form a common electrical circuit.

12. The card reader according to claim 1, wherein the at least one drill-protection conductor track and the at least one lift-off-protection conductor track each form electrical circuits which are separate from one another.

13. The card reader according to claim 1, wherein the card reader is mounted on a printed circuit board, and electrical contact is made with the connection contacts of the hood by corresponding mating contacts of the printed circuit board.

14. A hood for a card reader covering a contact unit of the card reader which is composed of plastic, the hood comprising:
- an at least two-layered conductor track foil which is back-moulded on an inner side of the hood;
- wherein a first layer of the at least two-layered conductor track foil, which faces the hood, has an extensive drill-protection conductor track structure with at least one continuous drill-protection conductor track; and
- wherein a second layer of the at least two-layered conductor track foil, which faces away from the hood, has a lift-off-protection conductor track structure with at least one lift-off-protection conductor track;
- wherein the at least one drill-protection conductor track is routed to the second layer by means of through connections of the conductor track foil and ends in electrical connection contacts of the second layer; and
- wherein the at least one lift-off-protection conductor track ends in electrical connection contacts of the second layer.

\* \* \* \* \*